Nov. 20, 1928.

L. R. KOENIG 1,692,412

GYROSCOPIC SPEED INDICATOR

Filed May 28, 1926 5 Sheets-Sheet 1

Fig.1.

INVENTOR
Lloyd R. Koenig,
By Delos G. Haynes,
ATTORNEY

Nov. 20, 1928.

L. R. KOENIG 1,692,412

GYROSCOPIC SPEED INDICATOR

Filed May 28, 1926   5 Sheets-Sheet 4

INVENTOR
Lloyd R. Koenig,
By Delos G. Haynes
ATTORNEY

Nov. 20, 1928.

L. R. KOENIG 1,692,412

GYROSCOPIC SPEED INDICATOR

Filed May 28, 1926   5 Sheets-Sheet 5

INVENTOR
Lloyd R. Koenig.
By Delos G. Haynes
ATTORNEY

Patented Nov. 20, 1928.

1,692,412

UNITED STATES PATENT OFFICE.

LLOYD R. KOENIG, OF ST. LOUIS, MISSOURI.

GYROSCOPIC SPEED INDICATOR.

Application filed May 28, 1926. Serial No. 112,245.

This invention relates broadly to calculators; in a more restricted sense to absolute- or ground-speed indicators; and with regard to certain more specific features, to a gyroscopic type of speed indicator or calculator adapted to calculate and indicate certain absolute velocities or components thereof, with respect to the surface of the earth as a surface of reference.

Among the several objects of the invention may be noted the provision of:

A ground-speed calculator and indicator adapted to continuously and at any instant indicate certain ground speeds such as keel speeds of the moving frame in which it is mounted, independently of mechanical connections between said moving frame and the earth, and independently of the possibility of sighting on the earth;

A ground-speed calculator and indicator of the class described which requires no stabilization for its successful operation;

A ground-speed indicator involving no compensating mechanisms for correcting undesirable yawing and like forces, but one which cancels the effects of such forces at their incipiency;

A ground-speed indicator adapted to indicate keel speeds of vehicles which may or may not be subjected to components of drifting velocities;

A ground-speed indicator of the class described which is neither bulky nor complicated, but on the other hand comprises a minimum number of simple elements;

A calculating instrument of the class described which may be ruggedly constructed at small outlay;

An instrument which is sensitive in operation, not delicate, but fool-proof, requiring only inherently rugged and easily adjusted elements in the construction thereof;

And one which can be depended upon to retain its accuracy under long and severe conditions of usage, including use under extreme variations in temperature. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated one of various possible embodiments of the invention.

Similar reference characters indicate corresponding parts throughout the several views of the drawings.

Broadly, the the present invention comprises a frame hung in bearings, the frame being preferably in stable equilibrium. The axis of swing is kept preferably at right angles to the line of the velocity to be measured. Two neutrally equilibrated gyroscopic elements are pivotally mounted on this frame by means of pivotal axles or gudgeons positioned preferably parallel to each other and at right angles to the said axis of swing. The gudeons or axles of these gyroscopic elements are geared in a one to one ratio. The rotors of the gyroscopic elements are driven in opposite directions at substantially equal speeds and are positioned at right angles to said parallel axes.

The stable frame comprises a pendulous system carrying two gyroscopes suspended in neutral equilibrium. These gyroscopes are free to precess about their geared axes when torque is applied to the axis of suspension, and only when such a torque is applied. When such a torque is applied (as when acceleration of the system takes place) the gyroscopes precess in opposite directions in such a manner as not to hinder one another's motions. When any other torque is applied about the system, the incipient precessions of the gyroscopes take place in directions such as to cancel one another through said geared means, whereby error is eliminated.

For small precessional angles the angular displacements of the gyroscopes are very nearly proportional to the time integral of the applied torque. Hence the angles generated provide means for reading this time integral. Since the torque applied about the axis of swing is proportional to the acceleration (the gyroscopic resistance tending to keep the pendulous frame from swinging), then these precessional angles are very nearly equal to the time integral of the acceleration, which is equivalent to speed. The gyroscopes being in neutral equilibrium, retain a given reading until a negative torque is applied to act in a subtractive manner. The complete instrument with operating auxiliaries will now be described in view of the above.

Figure 1:
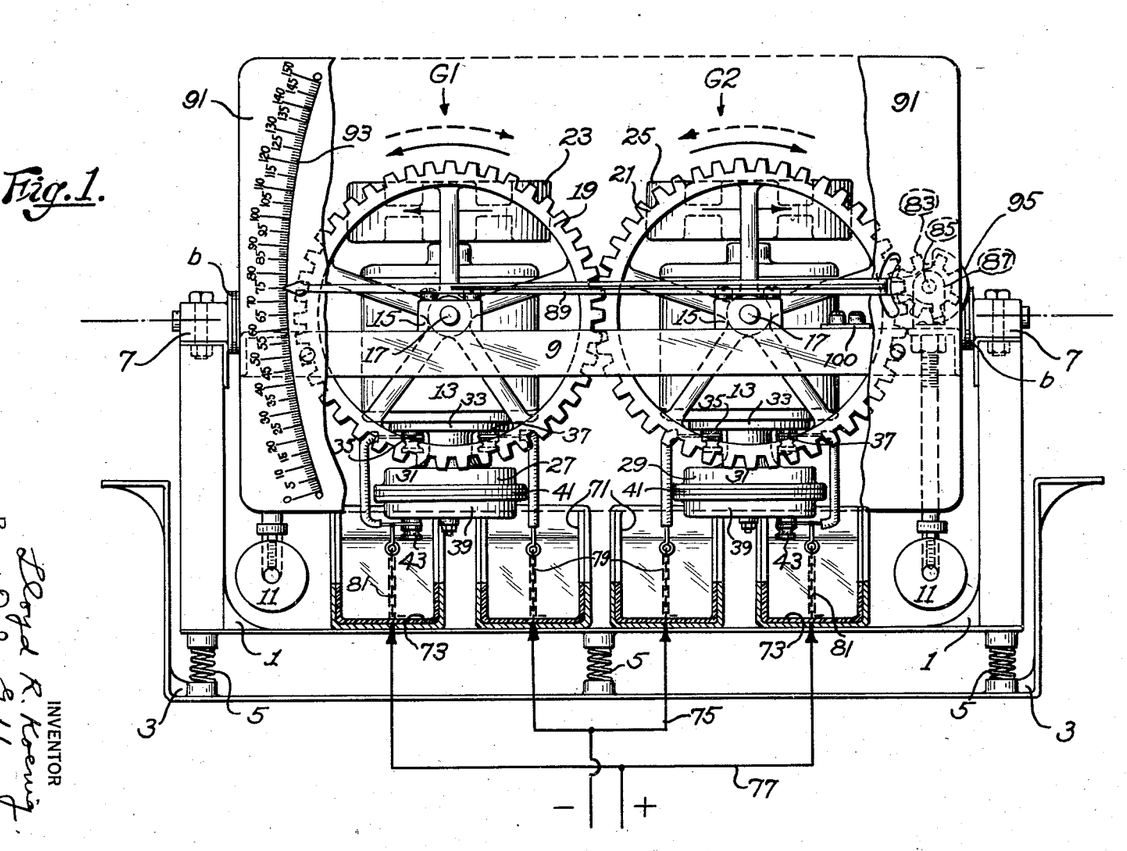
Fig. 1 is a front elevation of the device, certain portions being broken away.

Referring now more particularly to Fig. 1, there is illustrated at numeral 1, a supporting structure. This structure 1 is mounted on a supporting bracket 3 by means of a plurality of springs 5. The purpose of this spring mounting is to absorb as much shock and vibration as possible before it reaches the gyroscopic elements of the device. It is not absolutely necessary but represents a desirable refinement.

Figure 4:
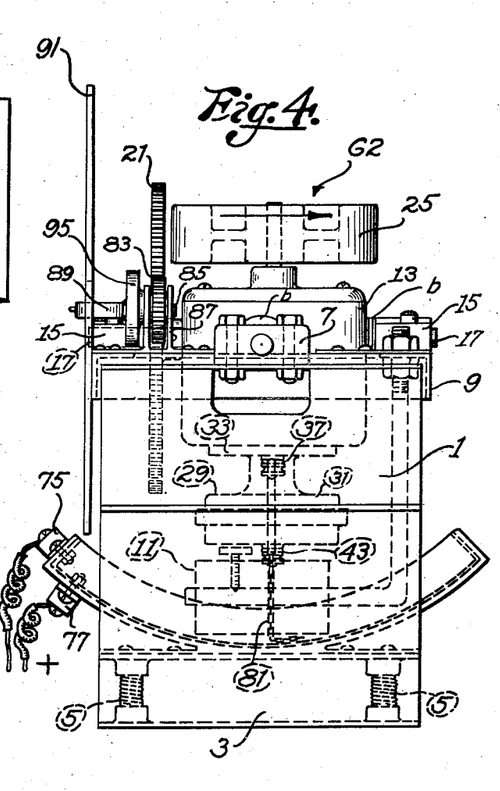
Fig. 4 is a right end elevation of Fig. 1.

Hung in the supporting structure 1, by means of a pair of suitable anti-friction bearings 7 is a gyroscope frame 9 (see also Fig. 2) which is normally held in a condition of stable equilibrium by means of a pair of depending weights 11. It is evident that the frame 9 and the elements to be mounted thereon may, as a unit, be held in stable equilibrium by placing the center of gravity of the system below the center line of the bearings 7. The weights here prescribed, are movable vertically and longitudinally, as indicated, for purposes of facilitating adjustments (Figs. 1 and 4). After they are once adjusted, they comprise part of the mass of the depending frame 9. It is evident that the frame 9 may, if permitted, oscillate forwardly and rearwardly with respect to the supporting structure 1—3, regardless of the angular position of said structure.

A pair of motor elements 13 are longitudinally gudgeoned in pairs of bearings 15 mounted on the gyroscope frame 9. The elements 13 comprise light, well balanced, electric motors in the present embodiment, and are made fast to the gudgeons 17 which rotatably support them. Adjacent gudgeons carry fast thereto gears 19 and 21. These gears 19 and 21 mesh with one another and have equal numbers of teeth. They are made to mesh with one another at positions in which the center lines of the motors 13 bear symmetrical relationships with respect to the frame 9 (see Figs. 1, 2, 8 and 10).

In operation the elements 13 oscillate through only limited angles in the bearings 15, so that all the gear teeth shown would not ordinarily be required. The present embodiment illustrates conventional gears, as they are more readily obtained than segmental ones.

Borne on the balanced rotors of the motors 13, are balanced fly-wheels or gyroscopic wheels 23 and 25. These wheels should be designed to give the highest polar moment of inertia with least weight. They are adapted to turn in opposite directions at relatively high rates of equal speeds, under influence of the motors 13. The motors, as illustrated, comprise the direct current type of governed motor, readily obtained to give the required conditions of speed and balance. Synchronized motors having equal speeds may also be used but are not here illustrated. The proper speed to be used is of the order of several thousand revolutions per minute, depending upon the moment of inertia of the wheels 23, 25, and other constants to be mentioned.

Each one of the governors 27, 29 for controlling the speeds of motors 13 of the present embodiment, comprises (Figs. 1 and 5) a metallic casing 31 formed with the metallic frame of a motor 13. An insulating ring 33 surrounds this casing for purposes of mounting the motor terminals 35, 37. A cap 39 is held to the casing 31 by means of an insulating ring 41 which carries a terminal 43 and an adjustable spark-resisting contactor point 45.

Figure 5:
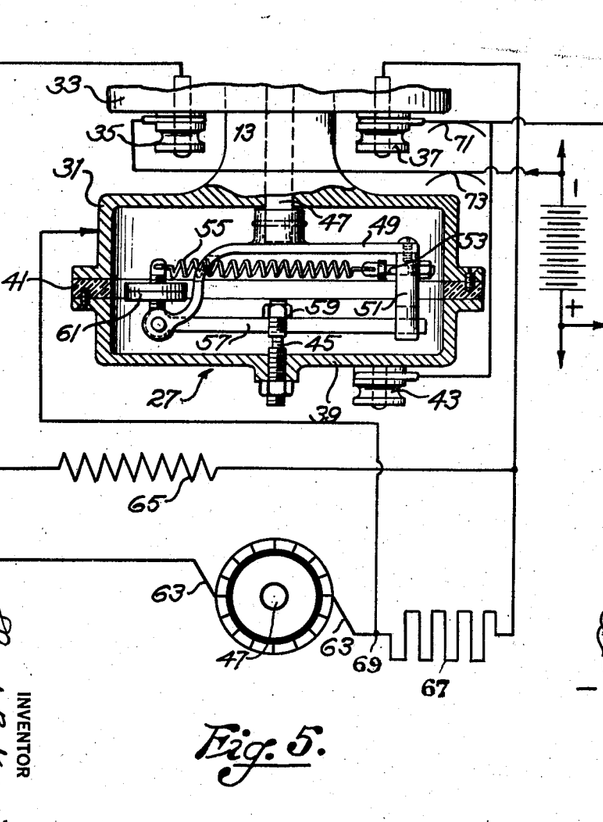
Fig. 5 is an enlarged fragmentary section of one form of speed regulating mechanism or governor.

The motor shaft 47 (in electrical contact with the casing 31) carries a governor arm 49 to one end of which is fastened a forked stem 51 carrying an adjustable spring support 53. A tension spring 55 is fastened to said support and to a bell-crank 57. The bell-crank 57 is pivoted to the other end of the arm 49 and on one arm thereof carries a complementary contactor 59 which normally engages said contactor 45 at low speeds. This arm is loosely held in the forked end of said pin 51. The outer arm of the bell-crank 57 carries an adjustable weight 61. It is evident that as the motor shaft 47 rotates, that at a predetermined speed the contactors 45 and 59 separate.

The connections for supplying current to a motor through the described governor are illustrated in Fig. 5. Battery or similar leads are electrically connected to the motor terminals 35, 37 in a manner to be described. The terminals 35, 37 are connected in series with the armature brushes 63 of the motor, the armature of said motor being in series with a resistance 67 and shunted by a field winding 65. A point 69 between the armature of the motor and the resistance 67 is grounded to said shaft 47 (and governor) by way of the case 31.

It is evident from Fig. 5 that at low speeds, the resistance 67 in the armature circuit is shorted out through the governor by way of the closed contactors 45, 59. At a predetermined higher speed this short is opened by the governor centrifugal action and the resistance 67 is thrown into the armature circuit, whereby the speed is slightly reduced to remake a contact. A slight increase in speed again breaks contact. The speed regulation thus gained is sufficient, the variation being only a fraction of a per cent. It may be noted that the contactors are on the center line of the shaft 47, this providing a rotating wiping and cleaning contact. The points are thus kept in a clean condition. Wear is slight because the tension in the spring is light and the ratio of the effective lever arms of the spring and contactor 59 is such as to reduce the contact pressure. This governor is not new per se and is described in particular, only to set forth the complete operative device. The unconnected arrows in Fig. 5 represent connecting points for the other twin motor 13 (not shown in Fig. 5).

Current may be fed to the motor terminals through any one of a number of brush systems permitting universal movement, the one shown (Figs. 1, 2 and 4) comprising pairs of insulated arcuate conducting troughs 71 and 73. These pairs are provided with inlet bridge terminals 75 and 77 respectively for leading in current, and are engaged by pairs of light flexible conducting chains 79 and 81 respectively. The chains lead current to the wires associated with the motor terminals as illustrated. It is to be understood that the troughs may comprise complete circles, if excessive climbing and diving characteristics are to be expected from the vehicle in which the device is mounted.

It is evident from the above that the gyroscopes $G^1$ and $G^2$ (comprising the wheels 23, 25, motors 13 and governors 27, 29 respectively) may have their rotating elements revolve at substantially equal and opposite speeds in various positions of the frame 9 with respect to the support 1, and in various positions of the said gyroscopes 61, 62 with respect to said frame 9. The gyroscopes are put in neutral equilibrium about the axes of the gudgeons 17. This is done by properly positioning said gudgeons on the gyroscopes.

Meshed with the gear 21 is a relatively small pinion 83 mounted on a shaft 85. The shaft 85 is rotatably held in a support 87 fastened to the frame 9. The shaft 85 has a pointer or indexing needle 89 fastened thereto which is adapted to pass through and traverse a dial face 91. A scale 93 on said face indicates speed in suitable units as the end of the needle traverses said scale. The face 91 is fastened to the forward face of the frame 9. The needle 89 is provided with a counter-balance 95.

Figure 8:
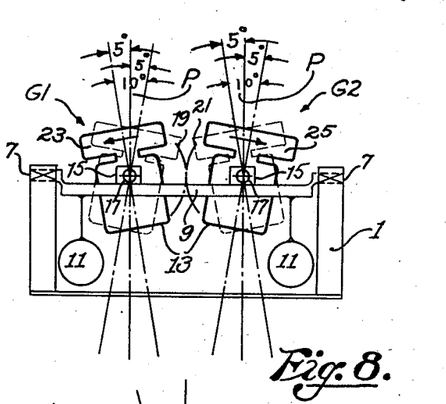
Fig. 8 is a diagrammatic front elevation showing certain alternate precessive positions of a pair of gyroscopes under varying conditions of velocity.

When the pointer is at zero position the gyroscopes $G^1$, $G^2$ are adapted to be in approximately the solid line positions shown in Fig. 8, namely tilted in the order of five degrees to the vertical. This angle is to be preferably as small as possible. When the pointer is at mid scale (Figs. 1 and 10) the gyroscopes are vertical, and when it is at full scale they are tilted in the order of five degrees in the opposite directions, this angle also being kept as small as possible and is preferably equal to the first named angle though this is not necessary.

Figures 2, 3:
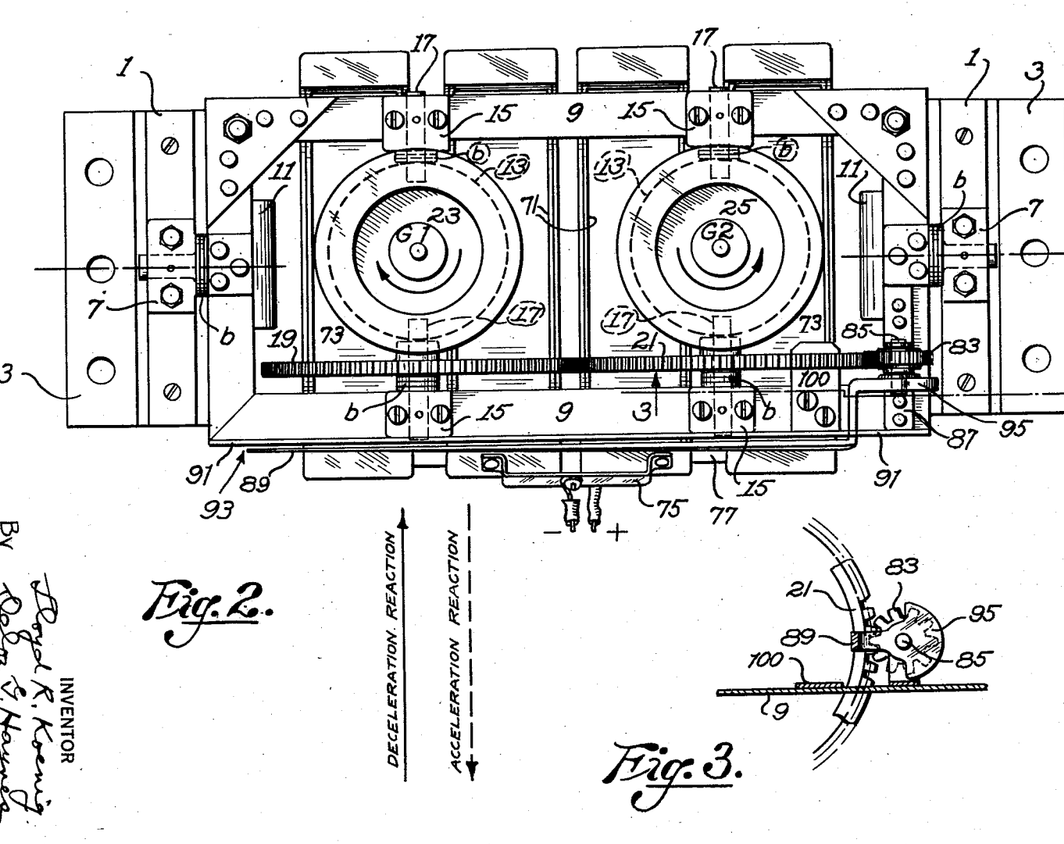
Fig. 2 is a plan view of Fig. 1.
Fig. 3 is a fragmentary section taken on line 3—3 of Fig. 2 and shows one form of multiplying mechanism.
Figure 9:
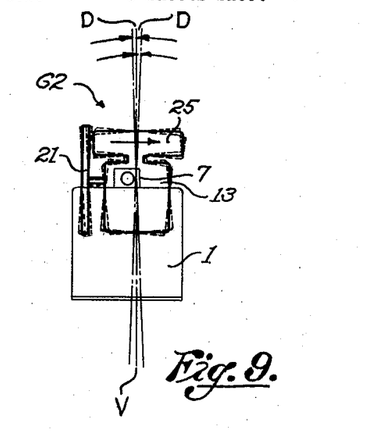
Fig. 9 is a diagrammatic side elevation of Fig. 8, showing certain angles of dip of said gyroscopes.
Figure 10:
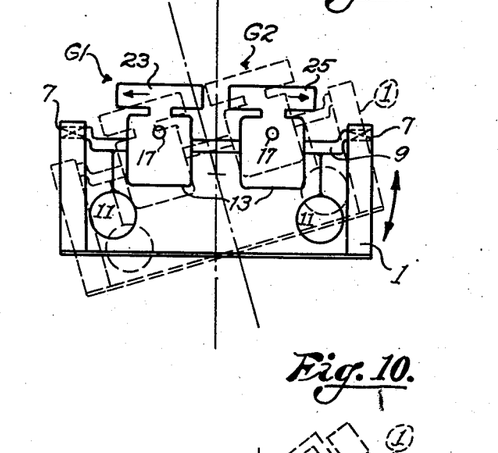
Fig. 10 is a diagrammatic front elevation illustrating in dotted lines the effect of tilting the instrument about a more or less longitudinal axis, as when the vehicle in which the instrument is mounted tilts sidewise.

Assuming the pointer 89 to be at zero position under the above described conditions, and the gyroscopes $G^1$ and $G^2$ spinning oppositely as illustrated in Fig. 2, then any torque applied around the axis of the bearings 7 will tend to produce, as regards the frame 9, an angle of dip D one way or another with respect to the vertical V (Fig. 9), depending upon the direction of said torque. The gyroscopes are free to precess at right angles to this torque and do so in accordance with determined laws (Fig. 8). The precession angles are lettered P. At the same time the precessing gyroscopes exert a gyroscopic resisting torque or couple to the applied torque or couple, which effectually limits the angular displacement D of the frame 9 from its vertical position.

For the higher rates of spin of the gyroscopes such as herein specified, the dip angle V, (for a given torque of substantial effect) is quite small, being of the order of a fraction of a degree for the inertia quantities involved. A given torque, if continued for a time will produce an appreciable precessional angle P however, which is very nearly proportional to the torque acting and the time during which it acts, that is, for a small range of the angle P. In other words, the angle P is very nearly proportional to the time integral of the applied torque or couple, especially when a portion of the angle lies on each side of the vertical, that is, on each side of the position of maximum gyroscopic resistance to turning of the frame, on either side of which the gyroscopic resistance decreases (Fig. 8). This angle can be governed in design for the torques involved by predetermining the gyroscope speeds and moments of inertia. The higher the speeds, the smaller the angles P and D become, which is as desired.

It should be understood that at any of the higher speeds the angle of dip D is almost inappreciable and of a constant quantity for a given torque, though real, while the angle P is appreciable for the purposes in hand and increases as time progresses for a given torque. This is also as it should be for the purposes in hand as will be seen later.

It is evident that if the gyroscope frame 9 be accelerated or decelerated from the bearings 7, in a line at an angle to the bearing center line, that a torque will be engendered of either a varying or constant amount lasting over a period of time. This is because of the effect of the depending mass of, and attached to the frame 9. The torque produces only the slightest angular dip displacement D, but the precessional angles P of the gyroscopes form at a rate very nearly in proportion to the time integral of said torque. The direction of formation of the precessional angles P are such as to set the momentum axes of the gyroscopes parallel to the said torque axis, with the gyroscopes spinning in the direction of torque. Also the torque is proportional to the acceleration or deceleration (negative or positive as the case may be) so that the precessional angles P comprise a very nearly accurate measure of the time integral of acceleration, or speed. By multiplying the angular effect as described and illustrated, and calibrating the scale 93, the result may be directly and easily read.

Positive and negative accelerations give positive and negative torques which are automatically integrated over time to give speed by increase and decrease in the angles P. The formations of the two respective angles for the two gyroscopes are independent, but they are equal and co-active for reasons stated. The result is that the gears 19, 21 do not resist one another but turn together. The angles P form in opposite directions (see Fig. 8).

The present construction should be clearly distinguished from those attempting to integrate an acceleration by means of its direct effect on a mass, without an intervening torque effect. This construction eliminates all complicated and delicate integrating mechanisms, and reduces the process by several steps by eliminating all measurement of acceleration ordinates which other integrators must do. Furthermore, the present device has an exceedingly steady and positive action, is strongly damped, and withal is sensitive to the least speed change.

It is clear that if an acceleration or deceleration is not at right angles to the center line of bearings 7, that this instrument will indicate the component of the resulting velocity which is at right angles to said center line. Hence if the device is mounted, say in an aeroplane, at right angles to the keel line thereof, and the plane is traveling with a ground speed $g$ (Fig. 7), then the component of speed read by the instrument is the well known keel speed $k$. The diagram also shows drift speed $d$, relative air speed $a$, and the speed of the wind $w$ over the earth. The relative size of the instrument is exaggerated in Fig. 7.

The importance of measuring the keel speed $k$ with a simplified form of instrument and by means of a simplified process is apparent by referring to literature on the subject and need not be gone into in detail here. For example, reference may be made to a paper by R. W. Willson and M. D. Hersey, Transactions A. S. M. E., vol. 45, 1923 (see pages 851 to 859; and particularly section 68, page 859). See also reprint No. 1741 A. S. M. E. publications entitled, Aeronautic Instruments, by M. D. Hersey.

Figure 12:
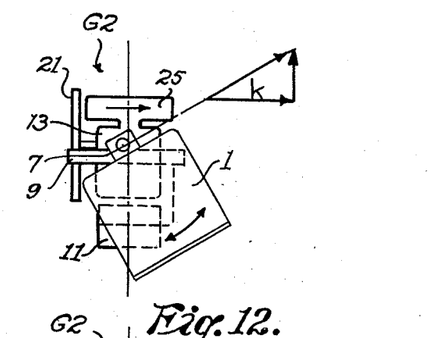
Fig. 12 is a diagrammatic end elevation illustrating the effect of climbing or the like of said vehicle.
Figure 13:
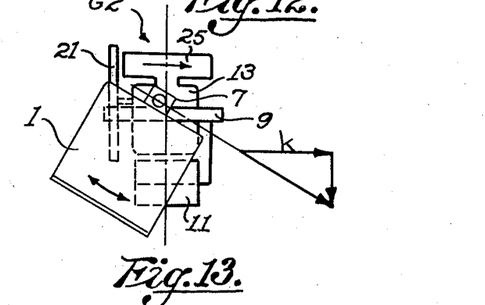
Fig. 13 is a view similar to Fig. 12 illustrating the effect of diving or the like of said vehicle.

It is evident from Figs. 12 and 13, that if the vehicle climbs or dives, that the support 1 turns or moves independently of the gyroscopic structure so that the actual ground keel speed component $k$ is the effective speed read by the instrument at all times. The frame 9 and the elements thereon remain vertical because they are in gravitational equilibrium and the slight frictional torque at the bearing 7 and brushes is inappreciable in causing error.

It is evident that only one gyroscope would need to be employed if it were not for yawing of the vehicle. Two gyroscopes are used and geared as shown for the following reasons:

(1) If the vehicle has a yawing or other motion component comprising a twist about its longitudinal axis (Fig. 10), then the applied torque axis is at right angles to what it was as described above. This tends to cause precession of the gyroscopes at right angles to the bearing axis 7—7 but each tends to precess in a direction opposite to that of its twin. These tendencies are equal and for that reason are cancelled in their effect on the frame 9, which would otherwise be tilted as if an acceleration torque had been applied. Hence no error is introduced due to side tilt due to yawing, banking or the like. This action holds for any precessional positions of the gyroscopes.

Figure 11:
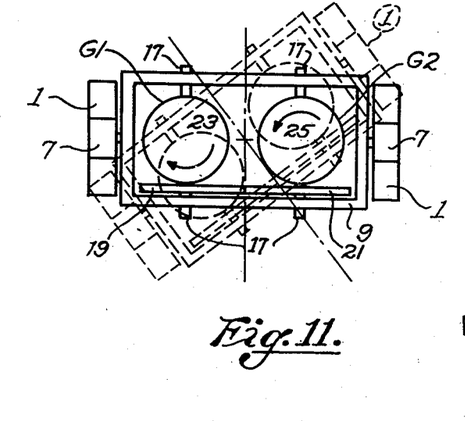
Fig. 11 is a diagrammatic plan view illustrating in dotted lines the effect of angular twist about a more or less vertical axis, as when said vehicle turns.

(2) If the vehicle turns or otherwise twists on a more or less vertical axis, then the alternate positions shown in Fig. 11 are engendered. Now if the gyroscopes happen to be vertical as shown, the applied torque due to the twist is about an axis already parallel to the axis of gyroscopic spin. Therefore no precession takes place from this cause. If the gyroscopes are not in a vertical position (and they usually are not due to precession) then the undesirable applied torque again acts to cause them to precess about the axes of the gudgeons 17. This fact would introduce error if it were not for the fact that the gyroscopes are rotating in opposite directions as described, whereby they tend to precess in opposite directions. Hence the gears 19 and 21 counteract the action of one another with equal force and the precessional tendency is cancelled. It should be understood that in both cases (1) and (2) that the cancelling effects do not prevent the proper torque due to acceleration or deceleration from swinging the frame 9 through the small angle D, nor the proper resulting precession of the gyroscopes from taking place at the time that the described cancelling effects are being carried on. The accelerating or decelerating torque merely causes enough unbalance in the counteracting action of the gears to give a correct speed reading. Hence the instrument will read tangential acceleration while rounding a curve but will cancel out the tendency toward twisting and tilting error. It is evident that centrifugal force in rounding a curve has no torque action around the axis of swing. Hence no error is introduced from this source.

It is evident from the above and the drawings that the depending frame 9 is always positioned substantially in a vertical plane to the speed component $k$ to be measured, regardless of yawing, banking, climbing, diving and the like movements or combinations of them. This is because of the action of gravity. Only one applied torque is effective to cause dip, and resulting precession, and that is the one due to accelerations and decelerations as described. No errors need be corrected for. They are kept entirely out of the integration.

After precession has proceeded to give a reading and the small angle of dip D has been formed (forward or backward), then as acceleration becomes zero and a constant speed is reached the frame 9 and the gyroscopes re-settle to an absolutely vertical position in a plane transverse to the fore and aft axis of the craft. A small compensating error is introduced by this action but it is inherently low because the amount of the re-settling torque is extremely small due to the extremely small angle D involved. It is evident that this resettling torque arm is to the acceleration torque arm as the sine of the small angle D, which is small indeed. The error is hardly discernible on the scale and is compensating when deceleration takes place. It should also be noted that the precessional angles are functions of time as well as of torque, while the angles of dip D are only functions of torque. Since the time for settling is almost a constant, and of only instantaneous duration with respect to the periods of acceleration or deceleration, the angles P cannot be appreciably affected.

It should also be noted that the combined movement of the vehicle about and around with the earth are of such an order as regards rates, that the resulting angular movements applied to the gyroscopes from this cause do not take place at a rate great enough to cause any or appreciable precession in an instrument of this class. Hence no effective error is introduced from this source. It takes a much more delicate and powerful gyroscopic device to take account of such movements. Furthermore, when the vehicle travels north and south, the oppositely rotating gyroscopes cancel all of this earth movement effect. Their capacity to cancel it is a function of how closely the vehicle is moving along a north and south line. This feature results in earth movement effects being reduced to such a low value as to be ineffective.

The devices lettered $b$ in the drawings comprise thrust bearings for facilitating operation. All bearings may be of rugged construction and should be as frictionless as possible. The bearings 7, and gudgeon bearings may comprise un-oiled or lightly oiled ball bearings for purposes of preventing temperature effects from gumming them. These bearings can be so constructed because they have little relative motion between ports. The motor bearings may be of standard well-lubricated construction because the motors will hold their speeds regardless of relatively moderate load changes due to energy spent in precessing and overcoming variable bearing friction.

It is evident from the above, that when the keel speed $k$ and the angle of drift X are known (Fig. 7), that the ground speed $g$ can be directly ascertained by a simple calculation, the keel speed $k$ having been calculated by the present device. Also, the keel speed equals the ground speed when the wind is along the keel, when the wind is not blowing, or where the vehicle is a non-drifting type such as land vehicles. The device has application on land vehicles where lateral speeds for mapping are desired, and not undulating speeds. From any of the instrument's speed readings, mapping distances can be ascertained by proper integrating devices attached to the instrument (not shown herein).

Figures 6, 7:
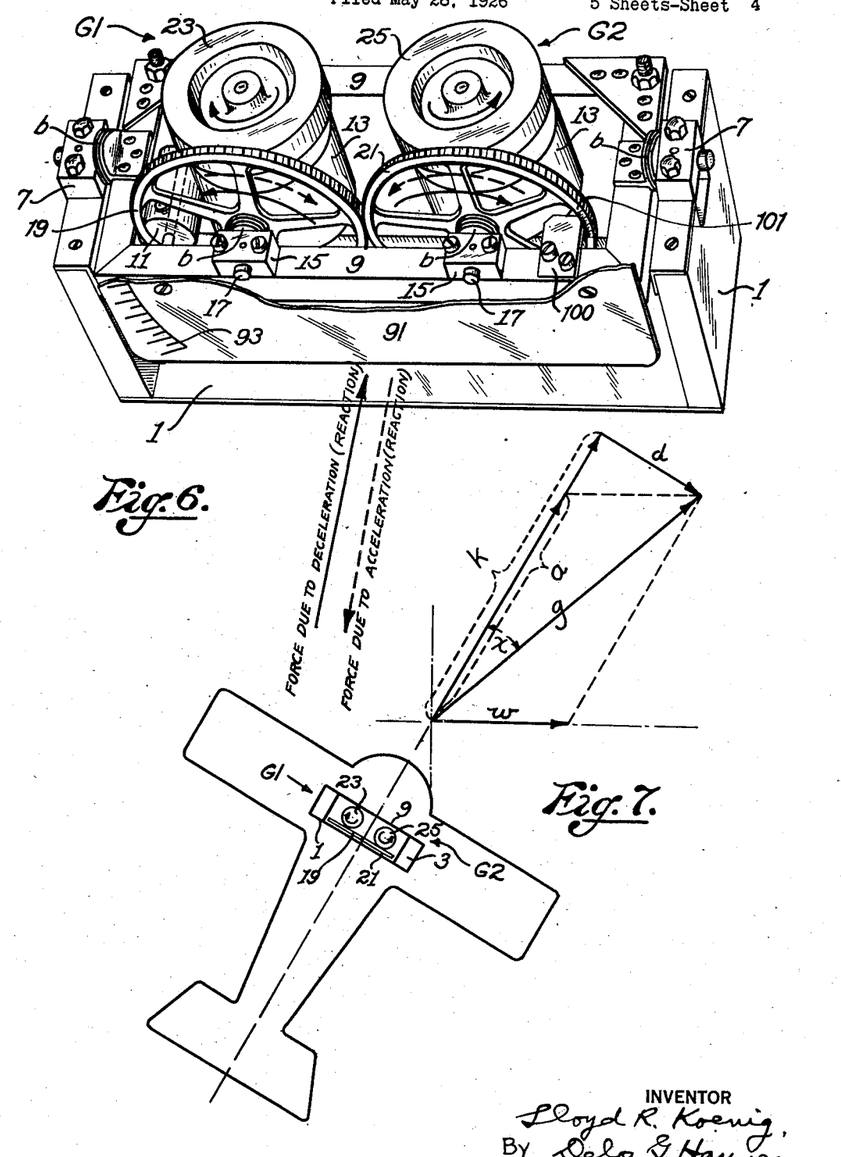
Fig. 6 is a perspective view of the basic elements of the invention, assembled without certain auxiliaries illustrated in the preceding views. (The purpose of this view is to illustrate more clearly, certain primary features of the invention.)
Fig. 7 is a diagrammatic plan view showing the manner of mounting the instrument for indicating keel speeds, and shows vectorially certain relative speed relationships of a vehicle drifting in a fluid such as air.

Reference to Fig. 6 illustrates the fact that the described multiplying dial and linkage need not necessarily be used for reading speed. A scale 101 may be directly inscribed on one of the gear elements. This eliminates several moving parts but decreases the size of the scale increments whereby they are made more difficult to read. This difficulty is readily mastered however by increasing the radius of the scale. This can be done independently of increase in gear diameter. The embodiment shown in Figs. 1 to 4 however, provides a compact instrument. The pointer 100 is also useful as a limiting stop.

Vibrations applied to the instrument do not effect precession of the gyroscopes to falsify readings because they provide only slight applied torques, the effects of which cancel one another. The constantly spinning gyroscopes also tend to lag in precession, so that the rapidly reversing applied vibratory torques have no effective precessional result.

The instrument, in fact, gives speeds with respect to the imaginary surfaces of the various imaginary spheres, on the surfaces of which the moving instrument happens to be located at a particular instant. However, when it is noted that the radius of the earth is of the order of four thousand miles, while the present order of elevation for flying machines is at most, not over seven miles, the attendant error from this source will be seen to be negligible. In fact for ordinary flying altitudes such as, say one half mile, the error is of the order of only .00012 of one per cent, and is only .00175 of one per cent at the present maximum flying elevations.

The instrument is mounted and operated as follows:

The framework 1, 3 is held to the vehicle or the like with the center line of the bearings 7—7 positioned at right angles to the line of motion, or the keel. Any position in the vehicle will suffice. Before the vehicle moves, the gyroscopes are set rotating at their proper speeds. The pointer is brought to its zero position against a stop, and since the precessional movement is thus clamped, the frame 9 readily settles to its proper plumb position. The pointer is then released and the device is ready for reading speeds when the vehicle is accelerated to movement.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a gyroscopic speed indicator, a frame rotatable about an axis of support, a gyroscope rotatably held for indicating purposes in said frame on its own axis of precession the latter axis being located at right angles to said frame axis and said gyroscope being adapted to precess its axis of spin about said axis of precession when said frame turns on its axis of support, said axis of spin being located at right angles to the axis of precession, the precessional angle being adapted to lie on both sides of a plane positioned perpendicular to the axis of support, the spin axis in normal starting position being inclined to said plane which is perpendicular to the axis of support at an angle substantially one-half of the indicating range thereof.

2. In a gyroscopic speed indicator, a supporting device, a frame rotatable about an axis of support in said supporting device, a pair of electrically operated gyroscopes rotatably held in the frame on their own axes of precession, said axes being located at right angles to said frame axis, said gyroscopes being adapted to precess their axis of spin about said axes of precession when said frame turns on its axis of support, said axis of spin being located at right angles to the axes of precession, means coupling said gyroscopes adapted to prevent precession under predetermined conditions of movement of the frame, arcuate terminal means associated with said supporting device, and flexible leads suspended from the gyroscope and contacting with said arcuate terminal means, whereby current may be supplied to said gyroscopes under all relative operating positions of the supporting device, frame and gyroscopes.

3. In a gyroscopic speed indicator, a supporting device, a frame rotatable about an axis of support in said supporting device, a pair of gyroscopes rotatably held in the frame on their own axes of precession, said axes being located at right angles to said frame axis, said gyroscopes being adapted to precess their axis of spin about said axes of precession when said frame turns on its axis of support, said axis of spin being located at right angles to the axes of precession, means coupling said gyroscopes adapted to prevent precession under predetermined conditions of movement of the frame and speed governing means operated by each of the two gyroscopes respectively for controlling the speeds thereof.

4. In a gyroscopic speed indicator, a movable supporting device, a frame rotatable about an axis of support on said movable supporting device, an electrically operated gyroscope mounted in said frame for relative movement and means for delivering current to said gyroscope including a contact mounted on said supporting device and flexible leads suspended from the gyroscope and slidably engaging said contact, whereby movement of the frame may be accommodated without substantially affecting the action of the gyroscope.

5. In a gyroscopic speed indicator, a frame rotatable about an axis of support, a gyroscope rotatably held for indicating purposes in said frame on its own axis of precession the latter axis being located angularly to said frame axis, the gyroscope being adapted to pressess its axis of spin about its said axis of precession when said frame turns on its axis of support, said axis of spin being located angularly to the axis of precession, the precessional angle being adapted to lie on both sides of a predetermined position of maximum gyroscopic resistance to turning of the frame, on either side of which position said gyroscopic resistance decreases, the spin axis in normal position being inclined to said predetermined position at an angle substantially one-half of the indicating range thereof.

6. In a gyroscopic speed indicator, a frame rotatable about an axis of support, a pair of gyroscopes rotatably held in the frame on their own axes of precession, the latter axes being located perpendicularly to the frame axis, said gyroscopes being adapted by equal and opposite rates of spin to oppositely precess their axes of spin about their own axes of precession when said frame turns on its axis of support, said axes of spin being located at right angles to the axes of precession, the precessional angles being adapted to lie on both sides of planes perpendicular to the axis of support, the spin axes in normal position being oppositely inclined to said perpendicular planes through the axes of support and means coupling the gyroscopes about said axes of precession preventing precession under predetermined conditions of movement of the frame.

7. In a gyroscope speed indicator, a frame rotatable about an axis of support, a gyroscope rotatably held in said frame on its own axis of precession the latter axis being located at right angles to said frame axis and said gyroscope being adapted to precess its axis of spin about its own axis of precession when said frame turns on its axis of support, said axis of spin being located at right angles to the axis of precession, the precessional angle being adapted to lie on both sides of a plane positioned perpendicular to the axis of support, indicating means associated with the gyroscope to be driven thereby, an evenly divided scale for said indicating means, said precessional angle being limited to a predetermined value, such that said scale is substantially accurate to indicate the summations of time integrals of positive and negative torques applied around the frame axis, the spin axis in normal starting position being inclined to said plane which is perpendicular to the axis of support.

In testimony whereof, I have signed my name to this specification this 26th day of May, 1926.

LLOYD R. KOENIG.